UNITED STATES PATENT OFFICE.

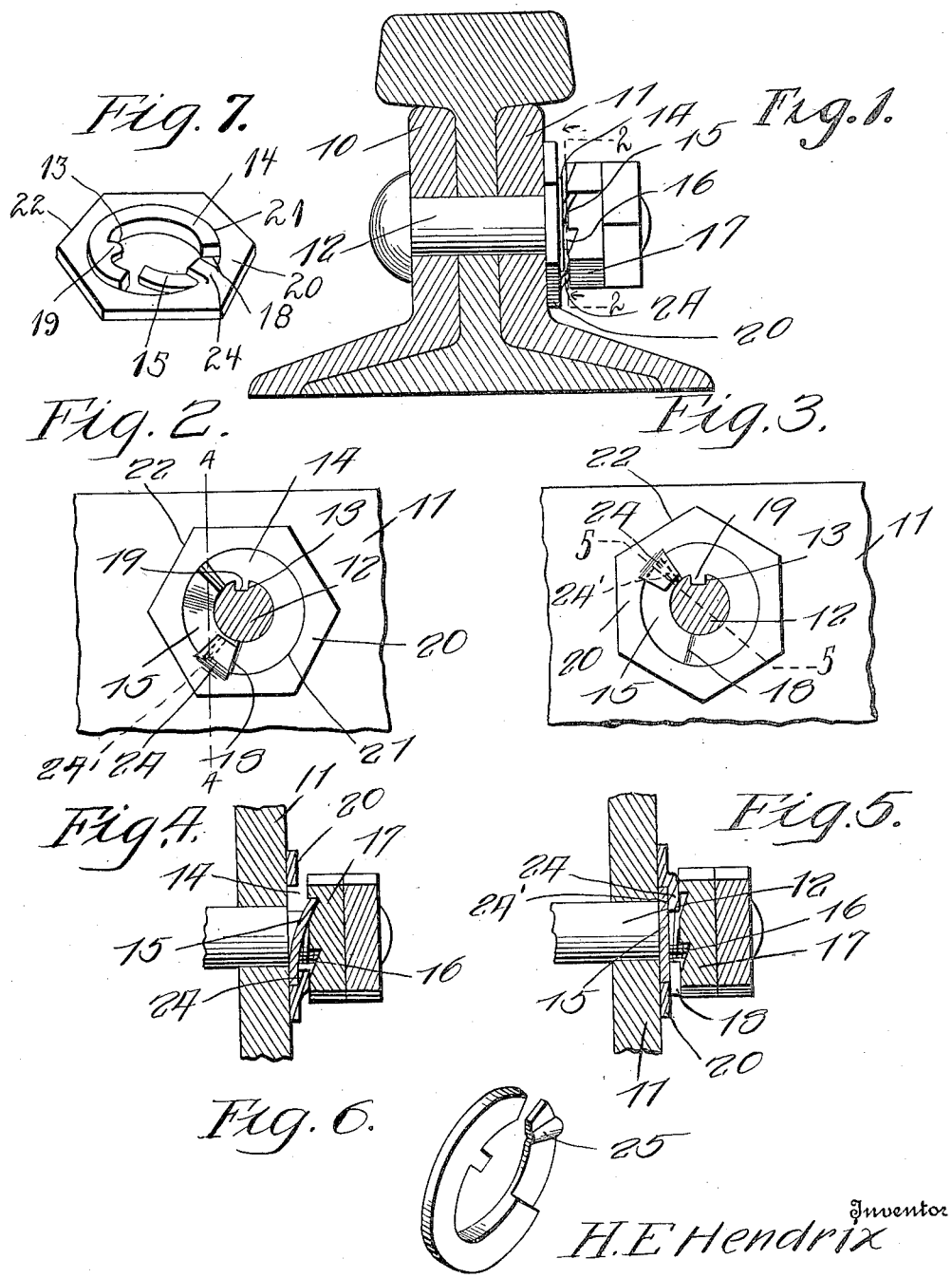

HARRY E. HENDRIX, OF WILLOW LAKE, SOUTH DAKOTA.

NUT-LOCK.

1,110,932.

Specification of Letters Patent. Patented Sept. 15, 1914.

Application filed June 19, 1913. Serial No. 774,713.

*To all whom it may concern:*

Be it known that I, HARRY E. HENDRIX, a citizen of the United States, residing at Willow Lake, in the county of Clark, State of South Dakota, have invented certain new and useful Improvements in Nut-Locks; and I do hereby declare the following to be a full, clear, and exact description of the invention, such as will enable others skilled in the art to which it appertains to make and use the same.

This invention relates to improvements in nut and bolt locks.

One object is to provide a novel and simple nut and bolt lock of the spring tongue washer type.

Another object is to provide means for unlocking the locking washer so that the nut can be readily removed.

Other objects and advantages will be apparent from the following description when taken in connection with the accompanying drawings.

In the drawings: Figure 1 is a sectional view through a rail and fish-plates showing a bolt equipped with my invention. Fig. 2 is a transverse section on the line 2—2 of Fig. 1, showing the locking devices in elevation. Fig. 3 is a similar sectional view showing the unlocking device in operative position. Fig. 4 is a vertical section on the line 4—4 of Fig. 2, the nut being applied. Fig. 5 is a vertical section on the line 5—5 of Fig. 3. Fig. 6 is a perspective view of a modified form of the locking washer. Fig. 7 is a perspective view of the washer 20.

Referring particularly to the accompanying drawings, 10 and 11 represent fish-plates and rail of a rail joint through which is disposed the bolt 12. This bolt has a longitudinal groove 13, the purpose of which will appear later.

The preferred form of my locking washer is composed of metal and in the form of a flat ring 14. This ring is open at one side, and reduced in thickness from one side of the opening back a suitable distance in the plate. This reduced portion 15 is bent slightly out of the plane of the plate and forms a resilient locking tongue which is adapted for engagement in the notches 16 formed on one face of the nut 17. This reduced portion of the plate results in a shoulder 18. Projecting inwardly into the opening in the center of the plate is a lug 19 which is engaged in the longitudinal groove of the bolt, hereinbefore mentioned, and serves to prevent the relative rotation of the washer on the bolt.

Disposed concentrically around the washer is a thinner washer plate 20, the opening 21 in the center thereof being approximately the same size as the outer perimeter of the first washer. This washer plate 20 has a number of faces 22 for engagement by a wrench and is also provided with an offset tongue 24 which projects inwardly into the central opening. When these plates are placed in proper concentric relation, this offset tongue 24 is disposed on the base of the spring tongue of the locking washer, and abuts against the shoulder 18. The two washer plates are placed on the bolt and then the nut screwed thereon, and by the engagement of the spring tongue with the notches of the nut, the nut is prevented from retrograde movement.

To unlock the device, that is to release the tongue from the notches of the nut, a wrench is provided to turn the washer plate 20 so that its offset tongue comes between the nut and the spring tongue and forces said tongue from the nut. The nut can then be quickly unscrewed from the bolt.

It will be noted that the off-set tongue lies flush with the thicker portion of the spring tongue plate and permits the spring tongue to readily engage with the notches of the nut.

In Fig. 6 there is shown a modified form of locking washer in which the spring tongue is formed with a kink or corrugation 25, which is adapted to engage with the notches of the nut, these notches being radially arranged concaved notches.

To prevent movement of the washer plate 22 from moving back when the nut is being unscrewed, I provide the lug 24 with a notch 24' into which the spring tongue 15 snaps when the washer plate is rotated to force said tongue out of engagement with the notches of the nut. Without such a provision, the strength of the spring tongue 15 might be sufficient to force the lug 24 against the adjacent face of the nut so that frictional contact would cause the washer plate 22 to turn with the nut, and turn the washer plate back to its original position and permit the tongue 15 to again engage the notches of the nut. This would defeat the object of the lug 24 and plate 22.

What is claimed is:

1. In a nut and bolt locking device, a non-rotatable washer plate having a spring tongue extending out of the plane of the plate, said tongue being reduced in thickness and forming a shoulder, an unlocking plate having a central opening receiving the washer plate, and an offset tongue on the unlocking plate disposed on the base of the spring tongue and against said shoulder.

2. In a nut and bolt locking device, a non-rotatable washer plate having a spring tongue extending out of the plane of its plate, a rotatable washer plate disposed concentrically around the first plate, and means carried by the second plate disposed in the plane of the first plate and arranged to move the spring tongue into the plane of said first plate.

In testimony whereof, I affix my signature, in the presence of two witnesses.

HARRY E. HENDRIX.

Witnesses:
J. W. IMLAY,
J. H. HENRY.

Copies of this patent may be obtained for five cents each, by addressing the "Commissioner of Patents, Washington, D. C."